United States Patent [19]

Garner

[11] Patent Number: 5,724,592
[45] Date of Patent: Mar. 3, 1998

[54] METHOD AND APPARATUS FOR MANAGING ACTIVE POWER CONSUMPTION IN A MICROPROCESSOR CONTROLLED STORAGE DEVICE

[75] Inventor: Richard P. Garner, Cameron Park, Calif.

[73] Assignee: Intel Corporation, Santa Clara, Calif.

[21] Appl. No.: 760,325

[22] Filed: Dec. 5, 1996

Related U.S. Application Data

[63] Continuation of Ser. No. 414,190, Mar. 31, 1995, abandoned.

[51] Int. Cl.[6] .................................................. G06F 1/32
[52] U.S. Cl. ..................... 395/750.04; 395/430; 395/494
[58] Field of Search .................................. 395/750, 430, 395/494; 364/707

[56] References Cited

U.S. PATENT DOCUMENTS

| | | | |
|---|---|---|---|
| 4,545,030 | 10/1985 | Kitchin. | |
| 4,644,494 | 2/1987 | Muller. | |
| 4,758,945 | 7/1988 | Remedi. | |
| 4,851,987 | 7/1989 | Day. | |
| 4,853,560 | 8/1989 | Iwamura et al.. | |
| 5,008,566 | 4/1991 | Hashimoto. | |
| 5,070,474 | 12/1991 | Tuma et al.. | |
| 5,086,387 | 2/1992 | Arroyo et al. | 395/551 |
| 5,148,380 | 9/1992 | Lin et al.. | |
| 5,167,024 | 11/1992 | Smith et al. | 395/750 |
| 5,184,031 | 2/1993 | Hayakawa et al.. | |
| 5,189,647 | 2/1993 | Suzuki et al.. | |
| 5,193,198 | 3/1993 | Yokuchi. | |
| 5,291,542 | 3/1994 | Kivari et al.. | |
| 5,369,771 | 11/1994 | Gettel. | |
| 5,426,755 | 6/1995 | Yokouchi et al. | 395/425 |
| 5,428,579 | 6/1995 | Robinson et al. | 365/230.03 |
| 5,524,230 | 6/1996 | Sakaue et al. | 395/430 |
| 5,590,341 | 12/1996 | Matter | 395/750 |
| 5,602,987 | 2/1997 | Harari et al. | 395/182.06 |

FOREIGN PATENT DOCUMENTS

| | | |
|---|---|---|
| 2088442 | 7/1993 | Canada. |
| 0392895A2 | 10/1990 | European Pat. Off.. |
| 2251323 | 7/1992 | United Kingdom. |
| 2251324 | 7/1992 | United Kingdom. |

OTHER PUBLICATIONS

Robinson, Kurt, "Trends in Flash Memory System Design", *Wescon Conference Record*, Nov. 1990, pp. 468–472.

*Primary Examiner*—Jack B. Harvey
*Assistant Examiner*—Jeffrey K. Seto
*Attorney, Agent, or Firm*—Blakely, Sokoloff, Taylor & Zafman

[57] ABSTRACT

A flash electrically-erasable programmable read only memory (EEPROM) array and a method for allowing a host computer to detect a plurality of different power-expending modes into which a storage device may be placed for operation, to select a particular one of those modes to match the power abilities of the host computer, and then to place the storage device in the proper power mode of operation to best function with the host system.

23 Claims, 3 Drawing Sheets

METHOD AND APPARATUS FOR MANAGING ACTIVE POWER CONSUMPTION IN A MICROPROCESSOR CONTROLLED STORAGE DEVICE

This is a continuation of application Ser. No. 08/414,190, filed Mar. 31, 1995, now abandoned.

BACKGROUND OF THE INVENTION

1. Field Of The Invention

This invention relates to microprocessor controlled storage devices such as flash EEPROM memory arrays, and more particularly, to methods and apparatus for managing power consumption in such storage devices.

2. History Of The Prior Art

Recently, microprocessor controlled storage devices such as flash EEPROM memory arrays have been used as a new form of long term storage. A flash EEPROM memory array is constructed of a large plurality of floating-gate metal-oxide-silicon field effect transistor devices arranged as memory cells in typical row and column fashion with circuitry for accessing individual cells and placing the memory transistors of those cells in different memory conditions. Such memory transistors may be programmed by storing a charge on the floating gate. This charge remains when power is removed from the array. The charge level may be detected by interrogating the devices. These arrays may be designed to provide a smaller lighter functional equivalent of a hard disk drive which operates more rapidly and is not as sensitive to physical damage. Flash EEPROM memory arrays are especially useful in portable computers where space is at a premium and weight is extremely important.

In order to allow flash EEPROM memory arrays to accomplish the storage functions normally accomplished by electro-mechanical hard disk drives, one type of flash memory manufactured by Intel Corporation of Santa Clara, Calif., includes a microprocessor which controls many of the functions of the storage device such as loading commands and data which are used by the storage device for accomplishing various housekeeping, setup, and other functions. The same storage device also includes hardware apart from the microprocessor which is especially designed to respond to the commands and utilize the data to accomplish the various read, write, and erase functions necessary to the storage of data in the memory array. Power must be supplied for operating all of these components.

Although these memory arrays were initially designed for use in portable computers, their desirable characteristics has allowed their use to expand into other forms of digital devices such a desktop computers and personal digital assistants (PDAs). To a great extent, this expansion has occurred along with the expansion of the PCMCIA bus into these other forms of digital devices. One problem created by this expansion has been that the sources of power available in these different uses vary widely. Thus, with PDAs and very small portable computers, a few double A batteries may supply the power; while desktop computers may provide very large amounts of power.

It is desirable to allow any storage device designed for portable, PCMCIA, or removable use to function with as many different types of digital systems as possible. However, in order to accomplish this, it is necessary that the storage device be capable of utilizing as little power as possible when functioning with low powered systems. To accomplish this, it is desirable to allow such storage devices to function at the lowest level of power possible.

SUMMARY OF THE INVENTION

It is, therefore, an object of the present invention to provide apparatus and a method for managing the power used by microprocessor controlled storage devices so that the storage device may be used in a plurality of different digital systems.

It is another object of the present invention to reduce automatically the power used by components of flash EEPROM memory arrays to a level compatible with a particular host system.

These and other objects of the present invention are realized in a flash EEPROM memory array by circuitry and a method for allowing a host computer to detect a plurality of different power-expending modes into which a storage device may be placed for operation, to select a particular one of those modes to match the power abilities of the host computer, and then to place the storage device in the proper power mode of operation to best function with the host system.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
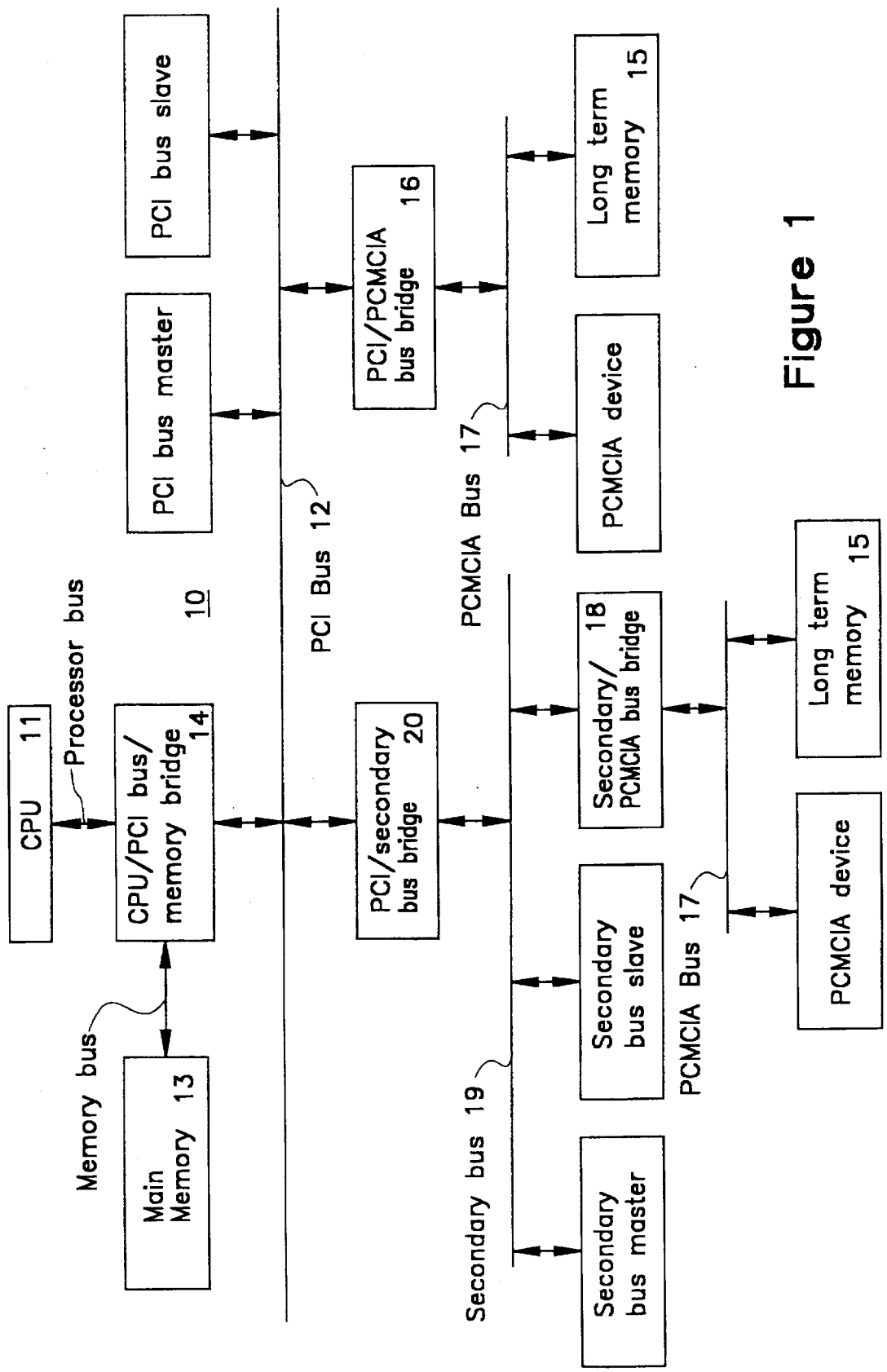
FIG. 1 is a block diagram of a computer system which may utilize the present invention.

Referring now to FIG. 1, there is illustrated a block diagram of a digital system 10 configured in accordance with one embodiment of the present invention. The present invention has application in any system, including a computer system, utilizing microprocessor controlled storage devices such as flash EEPROM memory arrays. The system 10 illustrated includes a central processing unit 11 which executes the various instructions provided to control the operations of the system 10. The central processing unit 11 is joined by a processor bus to a bridge circuit 14 which controls access to an input/output bus 12 adapted to carry information between the various components of the system 10. The bridge 14 is also joined by a memory bus to main memory 13 which is typically constructed of dynamic random access memory arranged in a manner well known to those skilled in the prior art to store information during a period in which power is provided to the system 10. In FIG. 1, the bus 12 is preferably a peripheral component interface (PCI) bus or other local bus adapted to provide especially fast transfers of data. This bus is chosen for the illustration of FIG. 1 in order to illustrate different positions at which devices designed in accordance with the present invention may be joined to the system utilizing a PCMCIA bus.

In a typical system 10, various input/output devices are connected as bus master and bus slave circuits to the bus 12. In the present illustration, however, rather than being positioned directly on the bus 12, long term memory 15 may be joined to the PCI bus 12 via a PCMCIA bridge circuit 16 and a PCMCIA bus 17, each of which is designed in accordance with the specifications of the Personal Computer Memory Card International Association (PCMCIA), or by other circuitry for allowing portable or removable use. Alternatively, long term memory 15 may be joined to the system 10 through a PCMCIA bridge circuit 18 and a PCMCIA bus 17 which are joined to secondary bus 19 which is in turn joined to the PCI bus 12 by a PCI to secondary bridge circuit 20. The secondary bus circuit might be of a number of well known types such as an Industry Standard Association (ISA) bus or a EISA bus.

Other methods of connection to digital systems utilizing PCMCIA buses are well known to those skilled in the art and may be used in practicing the present invention.

Rather than the electro-mechanical hard disk drive which is typically used for long term memory, a flash EEPROM memory array may be used as the long term memory 15. Such a flash EEPROM memory array may be a single bit or a multi-level memory system (a memory system in which a memory cell may store more than one binary bit) and may include circuitry for controlling the operation of the memory array including all of the operations associated with reading, programming (writing), and erasing the memory array.

Figure 2:
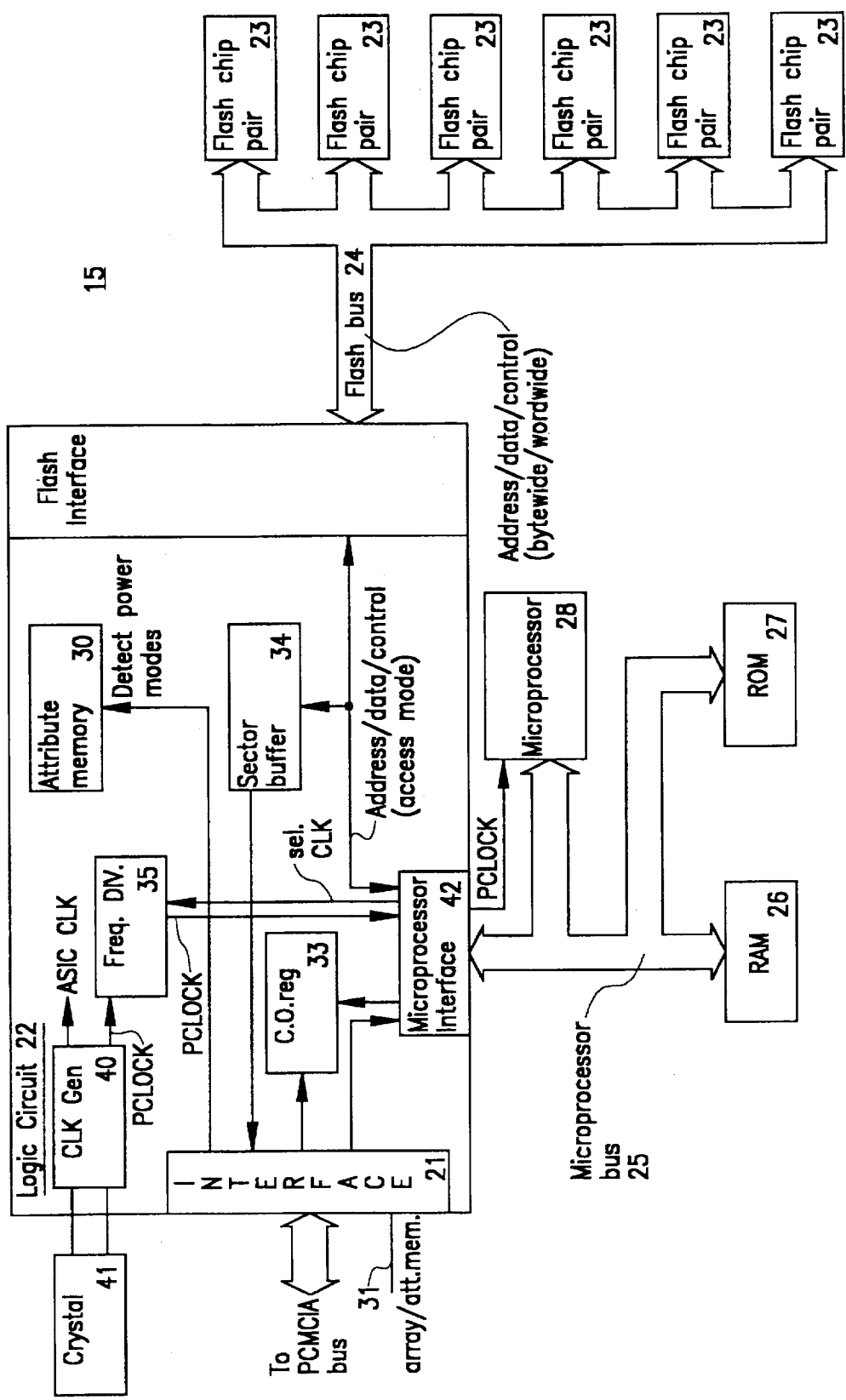
FIG. 2 is a block diagram of a flash EEPROM memory array constructed in accordance with the present invention.

FIG. 2 illustrates in block diagram form a long term memory system 15 such as that illustrated in FIG. 1. In the present case, the memory system 15 is a microprocessor controlled flash EEPROM memory array. The memory system 15 is joined to the bus 12 through an interface 21. The interface 21 provides appropriate circuitry for decoding signals furnished on the PCMCIA bus to a logic circuit 22. In one embodiment, the logic circuit 22 is an application specific integrated circuit (ASIC) which provides logic for implementing and coordinating the various operations of the flash memory system 15 such as reading, writing, erasing, and determining the status of the various portions of the flash EEPROM memory array. The logic circuit 22 functions as a command center and controls operations occurring in a plurality of flash EEPROM chip pairs 23 via a flash bus 24 so that those chips function together as a long term memory system.

The logic circuit 22 is assisted in its operations by a microprocessor 28 which is associated on a microprocessor bus 25 with random access memory 26, and read only memory 27. For the purposes of the present invention, the microprocessor 28, random access memory 26, and read only memory 27 function essentially as a general purpose processor in a manner well known to those skilled in the art. The microprocessor 28 is used, among other things, for implementing commands to the memory system 15 for initiation of various operations of the array. The read only memory 27 is utilized in one embodiment to store processes utilized in managing the power required by the memory system 15.

In one embodiment, each pair of flash EEPROM memory chips 23 includes thirty-two blocks of memory transistors. Each chip pair 23 includes a flash EEPROM memory array which in one embodiment includes thirty-two individual blocks each including sixty-four kilobytes of flash EEPROM memory cells with gating/sensing and decoding circuitry for controlling the bitlines and output sensing devices of the array.

In general, the operations of the microprocessor 28 and the operations within the array comprising the chip pairs 23 take place independently of one another. In fact, when the memory array is being accessed, the microprocessor 28 is not functioning.

U.S. patent application Ser. No. 969,131, entitled *A Method and Circuitry For A Solid State Memory Disk*, Wells and Hasbun, filed Oct. 30, 1992, and assigned to the assignee of the present invention provides a further description of one arrangement for controlling the operation of a flash EEPROM memory array.

As has been mentioned, it is desirable to allow microprocessor controlled storage devices to operate with a large number of different digital systems which range from personal digital assistants to desktop computers. Many of these systems have very small amounts of power available to operate the input/output devices such as long term memory. It is desirable to allow storage devices to function with all of these possible systems in the power ranges available to each of these systems.

The present invention accomplishes this by providing a number of different modes of operation in which different amounts of power are expended by the storage device 15. The invention provides an arrangement by which a host system may detect the power ranges available to the storage device, then select the power range most appropriate to operation with the host. By selecting the appropriate power mode of operation for the storage device, the storage device may be caused to carry out its various functions such as accesses utilizing techniques and operating at rates at which power usage is adapted to suit the power available to the host system.

Various components of the storage device 15 are specifically adapted to provide this result. First the logic circuit 22 includes an attribute memory 30 which is designed to perform in PCMCIA busing arrangements. This attribute memory 30 is typically random access memory (RAM) which may include typically 256 bytes adapted to store data provided when power is applied to the storage device 15. These data signify the operating characteristics of a device adapted to function when connected to a system through a PCMCIA bus. Such an attribute memory may also be provided in systems in which a device is adapted to function when connected through an arrangement other than a PCMCIA bus. One of the forms of data provided under the specifications for operating through the PCMCIA bus includes certain bits of the attribute memory which may indicate the power required by the device for operation. The portions of this data are often referred to as "tuples" in the specification; and there are optional power description tuples which may be used by a designer of an input/output device to indicate various aspects of the power required for its operation.

In one embodiment of the present invention, data is stored so that it is furnished to the power tuples of the attribute memory to indicate four distinct power modes of operation which use progressively less power. These power tuples are read by the host system over the bus to which the storage device is joined by selecting attribute memory rather than the storage array by providing a selection signal at an external pin 31. A host system which is aware of the power modes available, may select an appropriate mode and write its selection to a device which stores configuration options. In one embodiment, a configuration options register 33 includes two bits (bits 4 and 5) which may be placed in different states to indicate a total of four possible power modes of operation. In another embodiment, an ATA features register may be used to store these bits. In one embodiment, if both bits are zeroes the highest power mode is selected; while if both bits are ones the lowest power mode is selected. Allowing zeroes to select the highest power mode allows the highest power mode to be selected as a default mode of operation.

Once a mode of operation has been set by a host system when power is applied to the system, the microprocessor 28 utilizes processes stored in ROM 27 to place the storage device 15 in the proper power mode for operation. To do this, the microprocessor 28 tests the state of the bits 4 and 5 in the configuration options register 33 and runs the appropriate setup process. The four power modes exhibit two main differences.

First, the frequency of operation of the microprocessor may be set at any of four distinct frequencies which in one embodiment are 16 megahertz, 8 megahertz, 4 megahertz, and 1 megahertz. Second, the storage array portion of the storage device is accessed for read and write operations either one byte at a time or a word (two bytes) at a time.

In CMOS circuitry, power is expended only when switching occurs; consequently, the operation of the microprocessor 28 expends less power in a given period time at a lower frequency of operation. The frequency of operation is controlled by a frequency divider circuit 35 which divides down the processor clock frequency (PCLOCK) from a high value of 16 MHz. to fractions of 8 MHz., 4 MHz., and 1 MHz. In selecting a mode of operation, the microprocessor 28 sets the output of the frequency divider circuit 35 to the appropriate frequency. This clock value is then furnished to the microprocessor 28 for use in all of its operations. The lowest frequency is used for the lowest power mode while each higher frequency is used for the next higher power mode with the highest frequency being used for the highest power mode.

The flash EEPROM memory cells are arranged with gating/sensing and decoding circuitry for controlling the bitlines and output sensing devices of the array which are adapted to provide accesses of either eight or sixteen bits at once when performing either a read or a write operation. The drivers required for each bit in an access require substantial amounts of power. Consequently, accessing half the number of bits substantially reduces the instantaneous power required for an access. However, reducing the number of bits accessed requires that two rather than one access occur for each read and write operation in these bytewide access modes. Consequently, the performance of the storage device is degraded when using bytewide accesses. In selecting a mode of operation at startup, the microprocessor 28 sets the gating/sensing and decoding circuitry of the storage array to the appropriate conditions for either bytewide or wordwide accesses. Accesses of the array then take place in the appropriate mode during all of the succeeding operations.

In one embodiment of the invention, bytewide accesses are utilized in the two lower power modes while wordwide accesses are utilized in the two higher power modes.

Other attributes of the operation of a storage device may also be altered between the various power modes in order to conserve more or less power in some of the modes. For example, in flash EEPROM memories designed by Intel Corporation, a number of background processes are run for housekeeping purposes. One of these processes is a cleanup operation in which blocks of memory having a large amount of invalid data have valid data written to other blocks and are then erased and put back into operation. In one embodiment, such a flash array is capable of running two of these cleanup processes at once. In order to conserve power, the number of these cleanup processes which may be run together or with other operations may be reduced. Similarly, the number of other processes which may be run together or with other operations may be similarly reduced to provide a spectrum of power modes which may be selected. Those skilled in the art will recognize that more or less than four power modes may be easily implemented utilizing selections of these different variable operations.

One problem arises in implementing the present invention is that not all host systems are or will be aware of the different power modes of operation yet may desire to utilize a microprocessor controlled storage device which happens to provide such modes. Such host systems will typically be systems which do not need to conserve power. For that reason, a default mode of operation is provided in the processes run by the microprocessor 28. If a host system does not select another mode, then the storage device 15 runs in the highest power mode; in this mode accesses of the array are wordwide and the microprocessor 28 operates at the highest frequency available. However, it is also true that a storage device will probably not be able to function in this mode if the host provides insufficient power. Therefore, in one embodiment, the storage device always powers up in the lowest power mode so that it can function with low powered hosts. In order to resolve this conflict for host systems which do not set the bits 4 and 5 of the configuration options register to indicate a power mode and would therefore automatically switch to high power once configuration occurs, one embodiment of the invention delays the process of selecting a higher power mode after power up in the low power mode until a first operating command is received. By waiting for a first operating command from the host system before changing to the high power default mode, the microprocessor 28 in effect determines that the host system is actually interested in utilizing the device before switching to the high power mode.

Figure 3:
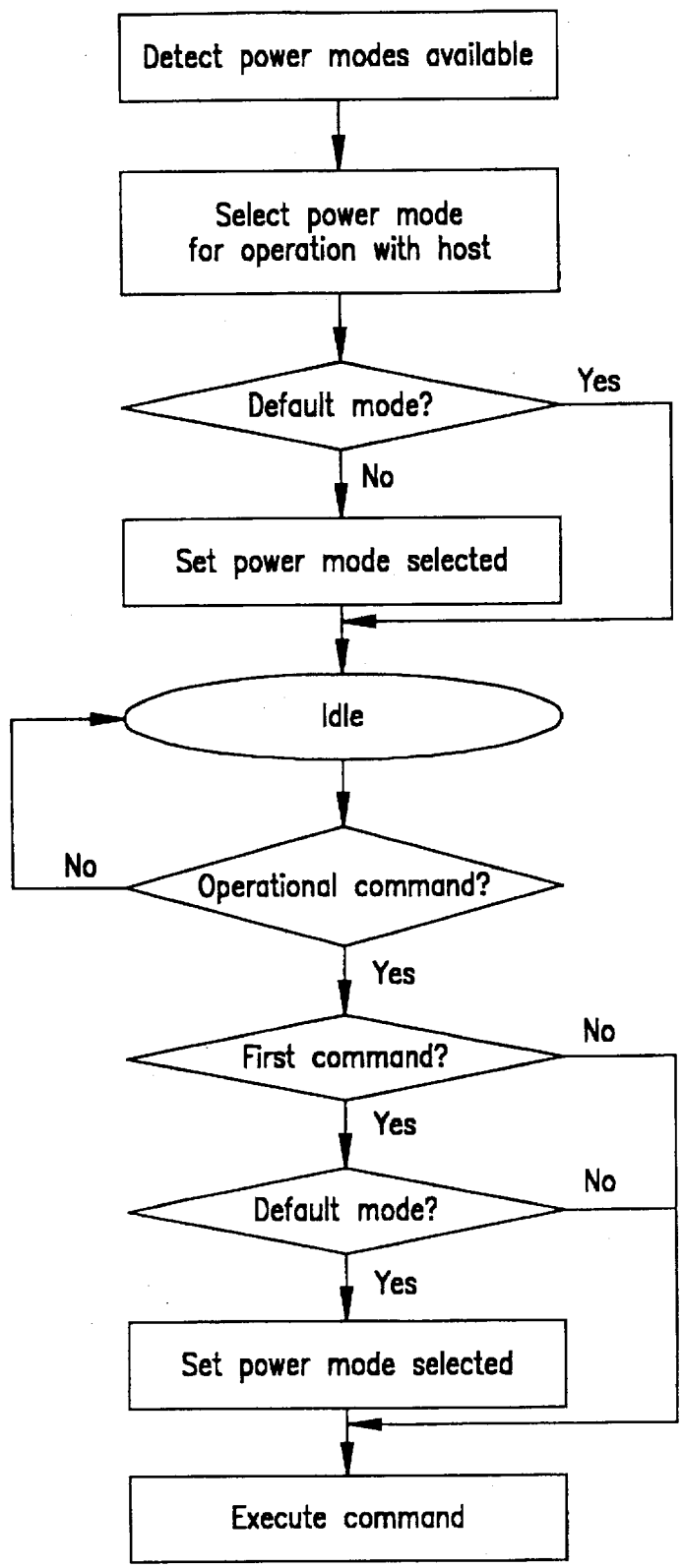
FIG. 3 is a flow chart describing the operation of a portion of the memory array in carrying out the present invention.

FIG. 3 is a flow chart illustrating the operation of the microprocessor 28 on startup. The host system, having read the attribute memory (or on its own initiative), writes a set of configurations options to the storage device 15. If the host is cognizant of the possible power modes, the set of configurations includes a power mode which is selected by setting the bits 4 and 5 of the configurations options register 33 to the appropriate power mode. The microprocessor 28 then tests to determine whether the power mode is set to a value (e.g., 00) indicating the default highest power mode. If the power mode is not the default mode, the microprocessor sets the correct power mode by selecting the appropriate frequency at the frequency divider circuit and the appropriate access mode for the memory array. The microprocessor may also select other power options by referring to the configurations options register whenever a particular operation is to be run in the device 15 to determine whether it can be run together with other operations in that particular power mode of operation. The power mode setting operation then idles. If the mode detected by the microprocessor is the default mode (e.g., 00) when it first checks the configuration register, the microprocessor 28 does not place the device 15 into the default mode but allows the operation to remain in the lowest power mode; and the power mode setting operation then idles.

When a first operational command is sent to the storage device 15, the microprocessor 28 first checks to determine that this is, in fact, a first operational command. This it determines by sensing the interrupt accompanying the write selecting the mode and checking the register 33 to determine if a configuration has been sent to the device. If this command is not a first operational command, the correct power mode will already have been set; and the process terminates. If this command is a first operational command, the microprocessor 28 tests to determine whether the configuration power mode is set to zero in both bits 4 and 5 of the configurations option register. If not, then the correct power mode has already been set; and the process terminates. If the configuration power mode is set to zero in both bits 4 and 5 of the configurations option register to indicate the highest power or default mode, the microprocessor sets the appropriate values for that mode; and the process terminates.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A flash electrically-erasable programmable read only memory (EEPROM) device comprising:
   a flash EEPROM array;
   a memory which stores indications of power modes in which the flash EEPROM device can be read from or written to;
   a configuration register which stores a power mode configuration value, provided by a host processor, which corresponds to one of the power mode indications stored in the memory; and
   a microprocessor, responsive to commands from the host processor, for reading the configuration register and for controlling operations related to the flash EEPROM array in accordance with the power mode configuration value.

2. A flash EEPROM device as claimed in claim 1 further comprising a memory which stores processes for selecting a mode for accessing the flash EEPROM array during read and write operations in accordance with the power mode configuration values.

3. A flash EEPROM device as claimed in claim 2 in which the mode for accessing the flash EEPROM array during read and write operations selects bytewide or wordwide accesses.

4. A flash EEPROM device as claimed in claim 1 further comprising a memory which stores processes for selecting operations which may be run concurrently by the flash EEPROM device in accordance with the power mode configuration values.

5. A flash EEPROM device as claimed in claim 1 further comprising a memory which stores processes for selecting a clock frequency for the microprocessor in accordance with the power mode configuration values.

6. A flash EEPROM device as claimed in claim 1 in which the microprocessor is also for controlling reading from and writing to the flash EEPROM array in each of the power modes in which the flash EEPROM device can be read from or written to.

7. A flash EEPROM device as claimed in claim 1, wherein:
   said microprocessor selects a clock signal for the operations related to said flash EEPROM array, and wherein said clock signal is selectably divided from a system clock signal in accordance with said power mode configuration values.

8. A flash EEPROM device as claimed in claim 1, wherein:
   said microprocessor selects either a byte-wide or a word-wide access mode for operations related to said flash EEPROM array in accordance with said power mode configuration values.

9. A microprocessor controlled storage device comprising:
   memory array means;
   microprocessor means, external to the memory array means, for controlling operations related to the memory array means;
   means for storing indications of power modes in which the storage device can be read from or written to;
   means for detecting indications, from a host processor, of power modes available;
   means for setting a power mode configuration which corresponds to one of the power mode indications stored in the means for storing; and
   means for responding to a set power mode configuration and for reducing power use of individual components of the storage device in accordance with the set power mode configuration.

10. A microprocessor controlled storage device as claimed in claim 9 in which the means for storing indications of power modes comprises:
   attribute memory storage means.

11. A microprocessor controlled storage device as claimed in claim 9 in which the means for responding includes firmware processes run by the microprocessor means.

12. A microprocessor controlled storage device as claimed in claim 11 in which the firmware processes run by the microprocessor means selects a clock frequency for operation of the microprocessor means.

13. A microprocessor controlled storage device as claimed in claim 11 in which the firmware processes run by the microprocessor means selects a mode for accessing the memory array means during read and write operations.

14. A microprocessor controlled storage device as claimed in claim 11 in which the firmware processes run by the microprocessor means selects which operations may be run concurrently by the storage device.

15. A computer system comprising:
   a central processing unit;

a system bus;

main memory; and a flash electrically-erasable programmable read only memory (EEPROM) device comprising:
- a flash EEPROM array,
- a memory which stores indications of power modes in which the flash EEPROM device can be read from or written to,
- a configuration register which stores a power mode configuration value, provided by the central processing unit, which corresponds to one of the power mode indications stored in the memory, and
- a microprocessor, responsive to commands from the central processing unit, for reading the configuration register and for controlling operations related to the flash EEPROM array in accordance with the power mode configuration value.

16. A computer system as claimed in claim 15 in which the flash EEPROM device further comprises a memory which stores processes for selecting a mode for accessing the flash EEPROM array during read and write operations in accordance with the power mode configuration values.

17. A computer system as claimed in claim 16 in which the mode for accessing the flash EEPROM array during read and write operations selects bytewide or wordwide accesses.

18. A computer system as claimed in claim 15 in which the flash EEPROM device further comprises a memory which stores processes for selecting operations which may be run concurrently by the flash EEPROM device in accordance with the power mode configuration values.

19. A computer system as claimed in claim 15 in which the flash EEPROM device further comprises a memory which stores processes for selecting a clock frequency for the microprocessor in accordance with the power mode configuration values.

20. A method of managing power in a microprocessor controlled storage device, the method comprising the steps of:

(a) identifying a plurality of operating power modes in which the storage device can be read from or written to;

(b) selecting an operating power mode from the plurality of operating power modes;

(c) storing, responsive to a host processor, an indication of the selected operating power mode; and (d) reducing power use of individual components of the storage device in accordance with the selected operating power mode, such that the storage device may still be read from and written to.

21. A method of managing power in a microprocessor controlled storage device as claimed in claim 20 in which the reducing step (d) comprises the steps of:

selecting a clock frequency for a microprocessor controlling the storage device; and selecting a mode for accessing a memory array of the storage device during read and write operations.

22. A method of managing power in a microprocessor controlled storage device as claimed in claim 20 comprising a further step of initiating operation of the storage device in a lowest power mode.

23. A method of managing power in a microprocessor controlled storage device as claimed in claim 22 in which the reducing step (d) occurs only after a first operational command is provided to the storage device.

* * * * *